United States Patent [19]

DiGiovanni

[11] Patent Number: 5,487,666
[45] Date of Patent: *Jan. 30, 1996

[54] SCHEMATIC PATCH PANEL

[76] Inventor: Thomas H. DiGiovanni, 11 Earth Star Place, Gaithersburg, Md. 20878

[*] Notice: The term of this patent shall not extend beyond the expiration date of Pat. No. 5,291,377.

[21] Appl. No.: 189,834

[22] Filed: Feb. 1, 1994

Related U.S. Application Data

[63] Continuation-in-part of Ser. No. 815,156, Dec. 31, 1991, Pat. No. 5,291,377.

[51] Int. Cl.$^6$ .................................................. G09B 25/00
[52] U.S. Cl. ............................ 434/72; 434/382; 439/491; 379/329
[58] Field of Search ............................ 434/72, 365, 382; 439/43, 491, 536; 361/601, 826; 395/200; 379/267, 210, 313, 321, 329, 397, 399

[56] References Cited

U.S. PATENT DOCUMENTS

| | | | |
|---|---|---|---|
| Re. 33,560 | 3/1991 | Rodgers | 379/329 |
| 1,861,224 | 5/1932 | Neir et al. | 379/313 |
| 2,507,744 | 5/1950 | Welch | 361/332 |
| 3,308,347 | 3/1967 | Klaiber . | |
| 3,610,810 | 10/1971 | Fribley, Jr. | 439/491 X |
| 3,631,374 | 12/1971 | Cartelli | 361/352 |
| 3,809,966 | 5/1974 | Tirrell et al. | 361/332 |
| 4,451,108 | 5/1984 | Skidmore | 439/536 |
| 4,479,317 | 10/1984 | Hanna | 439/491 X |
| 4,550,964 | 11/1985 | Donais et al. | 439/491 X |
| 4,563,053 | 1/1986 | Pavel | 439/43 |
| 4,675,900 | 6/1987 | Temkin | 379/329 X |
| 4,835,659 | 5/1989 | Goodson . | |
| 4,887,972 | 12/1989 | McLean et al. | 439/536 X |
| 4,927,383 | 5/1990 | Dürkoh et al. | 439/491 |
| 4,958,262 | 9/1990 | Wilkie, Jr. | 379/329 X |
| 5,125,852 | 6/1992 | Archer | 439/536 X |
| 5,291,377 | 3/1994 | DiGiovanni | 361/826 |

FOREIGN PATENT DOCUMENTS 1245433  7/1967  Germany ............................... 361/352

Primary Examiner—Joe H. Cheng
Attorney, Agent, or Firm—Jacobson, Price, Holman & Stern

[57] ABSTRACT

A schematic patch panel includes an enlargement of a customer's floor plan that is dry mounted to a piece of foam-core board or located on a stainless steel panel. The board is mounted in a frame that can be configured with a clear, locking cover for security purposes. The entire assembly is mounted on the customer's wall by brackets. At each of the computer wall outlet locations depicted on the floor plan, a double-sided RJ-45 panel jack is inserted through the floor plan. These panel jacks snap into the floor plan, requiring no other means of fastening. Any wall outlet depicted on the schematic patch panel is activated by connecting a telephone-type extension cable between the network central controller and that wall outlet icon. By this transfer, a different unshielded twisted pair cable connection line is activated and the individualized identifiers and other information particular to a certain terminal are also transferred.

14 Claims, 5 Drawing Sheets

SCHEMATIC PATCH PANEL

This is a continuation in part of application Ser. No. 07/815,156, filed Dec. 31, 1991, now U.S. Pat. No. 5,291, 377.

FIELD OF THE INVENTION

The present invention includes a graphically oriented patch panel for making network connections. Non-technical and non-computer literate personnel are enabled to connect a user to a network as if they were plugging in a telephone.

BACKGROUND OF THE INVENTION

Network patch panels have been used sparingly for years as a method of distributing network connections from a central point to branch locations throughout a building. Available patch panels are non-intuitive, in that they contain a series of up to 24 jacks per bank, assembled horizontally, with no reference as to the actual location (neither wall jack nor room) of the connected jack. (See FIG. 1).

Generally, only larger companies had the financial and technical resources available to use patch panel technology to take advantage of centrally administered network connections. Central administration of network connections allows cost and time effective monitoring of network activities, central point activation/deactivation of network users and eliminates the possibility of a user unplugging their computer from the network cabling and deactivating all users connected further down the line.

Typically, a company may wire their building for computer locations far exceeding their current staffing and/or computer systems resources in anticipation of future growth or with the knowledge that systems will be moved frequently from one location to another. It is not uncommon to have upwards of 250 wired jack locations throughout a company, yet have only 50 computer systems that will be connected to the network. Because typical network support hardware is configured in multiples of 10 to 12 users, the company with 250 wired locations but only 50 computers will purchase 5 network hubs (50 computers, divided by 10 ports per hub). Should any of the users need to be moved to another wired location within the building, it is more cost effective to "re-patch" that user on the patch panel, than to purchase an additional hub at $1500 to $2000.

Expensive coaxial cable has typically been necessary to make network connections. The added expense of making a central-point to user location cable drop connection for every user, as opposed to a point-to-point, chain type of wiring plan, usually prohibited the use of network patch panels.

With the development of network components that can use inexpensive, Unshielded Twisted Pair (UTP) cable (telephone-type wiring) the Central Point To User wiring scheme has become a cost-effective reality. According to *LAN Times*, 10Base T is the fastest growing cable scheme in use today. "Anyone contemplating cabling with coaxial cable instead of UTP using 10Base T technology is asking for trouble. 10Base T is easier to install, easier to maintain and offers superior management capabilities."

Freestanding computers are being networked together at an exponential rate, as companies realize the benefit of sharing the resources and information they currently have. The cabling scheme of choice is Unshielded Twisted Pair, because it is inexpensive, widely available and easy to install.

SUMMARY OF THE INVENTION

The present invention includes all of the positive features of traditional patch panels, yet retains none of the negative features. Some of the advantages obtained by the present invention are: (1) central administration of network connections, (2) centralized monitoring of network resources, (3) cost-effective use of other network hardware, (4) intuitive interface between user and network, (5) easy to relocate computer resources within a building, and (6) not network specific.

The schematic patch panel of the present invention includes an enlargement of a customer's floor plan that is dry mounted to a piece of ¼ inch foam-core board or printed on a plate, preferably of metal, and most preferably of stainless steel or aluminum. The board is mounted in a frame that can be configured with a clear, locking cover for security purposes. The entire assembly is mounted on the customer's wall by brackets.

At each of the computer wall outlet locations depicted on the floor plan, a double-sided RJ-45 panel jack is inserted through the foam core (RJ-45 receptacles are industry standard connections for UTP cabling) or into openings of a stainless steel panel. These panel jacks snap into the foam core, requiring no other means of fastening, or are secured within an opening of a metal plate by a snap-fit within the opening which has become open by removal of a cover plate.

Various sizes of the finished schematic patch panel will be available, depending on the actual size of the customer's building site. The overall scale of the floor plan will generally be ¼ inch=1 foot. This translates to a finished size of 25 inches by 38 inches for an actual 100 by 150 foot building site. A panel of this size is visually pleasing and easy to manipulate.

Each schematic patch panel is custom designed and fabricated to meet the specifications of each customer. A schematic of a customer's building site is based on a copy of the floor plan of their location. The floor plan can be: an architect's blue print or rendering, a builder rendering or floor plan, a hand drawn sketch of the floor plan, or a computer generated floor plan, either hard copy or disk-based. These floor plans will include the actual image of the client site, the locations of all computer connections in each room and the location of the network file server and patch panel.

The end user floor plan is applied to a stainless steel panel having a plurality of laser cut openings covered by a plurality of inserted cover plates. The floor plan is located on the stainless steel panel by architectural graphic tape securing a printed floor plan, securing a die-cut, self-adhesive vinyl overlay of a floor plan, or is hand drawn onto the plurality of cover plates with water soluble markers.

The supplied floor plan may be used to generate a computer image of the customer's floor plan that will ultimately serve as artwork for the full size schematic patch panel. In the case of hand drawn sketches, a computer floor plan will be generated.

A printout of the computer image will be returned to the customer for approval and sign-off. Most new construction is plagued by last minute changes in room dimensions, wall outlet locations and the actual number of wall outlet locations. (Room dimensions usually do not change within 10 days of building turnover; however, wall outlet locations and numbers can change up to and even after building turnover.)

Because of the inherent flexibility of the schematic patch panel of the invention, additions to the number of wall outlet locations can be made up to the time of shipment and additions of UTP cabling made after installation of the schematic patch panel are easily implemented by the customer.

Any wall outlet depicted on the schematic patch panel is activated by connecting a telephone-type extension cable between the network central controller and that wall outlet icon. By this transfer, a different UTP cable connection line is activated and the individualized identifiers and other information particular to a certain terminal are also transferred.

Any company in the 10 to 250 user range, regardless of the type of company or market affiliation would be interested in this product. This includes companies that are planning the installation of a new network, as well as those who already have a network that are in a position to upgrade their network or planning on moving to new facilities.

Therefore, if someone were to change locations within an office floor plan included on the schematic patch panel of the present invention, the telephone-type extension cable between a network central controller and the RJ-45 panel jack extending through the schematic floor diagram illustrative of a specific location where the user is presently located can be changed by removing the extension cable connected to the network central controller from the schematic patch panel and reinserting the extension cable to the RJ-45 panel jack connector at another location on the schematic patch panel representative of the new location of the user.

By this process, anyone is able to maintain a local area network intact without the need of an on-site computer literate person or requiring calling in of outside technical experts to arrange for the relocating of an individual within an office complex. Shifts in personnel are thereby easily accomplished with minimal downtime.

It is an object of the present invention to provide a schematic patch panel illustrative of a floor plan of a local area network.

It is another object of the present invention to provide a schematic patch panel illustrative of a floor plan of a local area network with panel jacks located on the schematic patch panel at a location representative of a location of a terminal of a network user.

It is yet another object of the present invention to provide a schematic patch panel illustrative of a floor plan of a local area network with panel jacks located on the schematic patch panel at a location representative of a location of a terminal of a network user with changes of location in personnel being easily accomplished by shifting a panel jack from a location indicative of a present location to another location schematically illustrated by the patch panel of the present invention.

It is still yet another object of the present invention to provide a schematic patch panel having a stainless steel plate having a plurality of laser cut openings covered by removable cover plates, with a floor plan of the user depicted on top of the cover plates filling the openings of the stainless steel panel for removal of the cover plates and insertion of a snap-in jack to interconnect a local area network with specific locations indicated on the floor plan.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
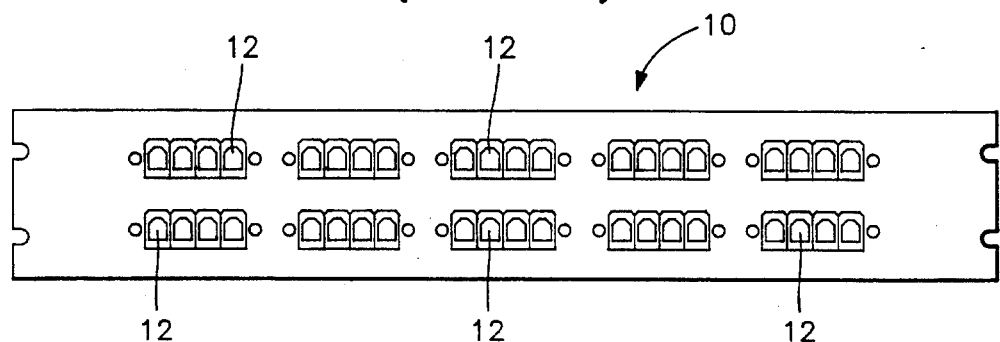
FIG. 1 is a front perspective view of a prior art patch panel.

In describing a preferred embodiment of the invention illustrated in the drawings, specific terminology will be resorted to for the sake in clarity. However, the invention is not intended to be limited to the specific terms so selected, and it is to be understood that each specific term includes all technical equivalents which operate in a similar manner to accomplish a similar purpose.

In FIG. 1, a conventional patch panel 10 includes a series of jacks 12 assembled horizontally. These jacks are connected by cable to various remote locations. No reference to the actual location of a terminal to which the jack relates is provided.

Figure 2:
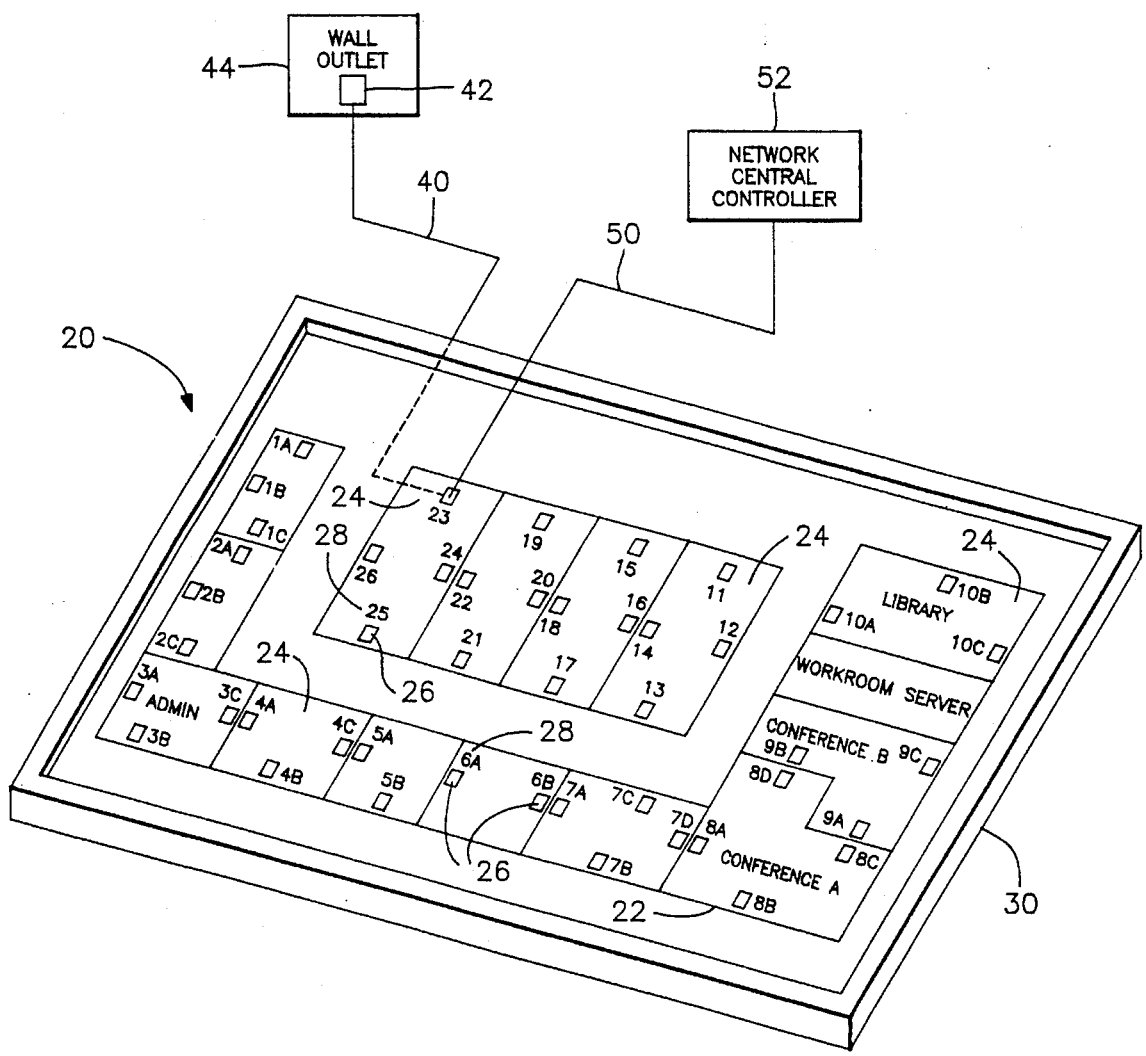
FIG. 2 is a perspective view of a schematic patch panel illustrative of the present invention.

With reference to FIG. 2, a schematic patch panel embodying the teachings of the subject invention is generally designated as 20. The schematic patch panel 20 includes a schematic diagram 22 of a customer's office floor plan. A plurality of rooms 24 representative of actual rooms at an office are arranged in the exact corresponding location of the floor plan 22 as exist at the job site. In each of the rooms 24 are a plurality of RJ-45 panel jack boxes 26, representative of wall outlets, which each have identifying indicia 28.

Typically, the office jobsite is pre-wired with UTP cable 40 between each possible connection point in the actual rooms of the jobsite and the schematic patch panel. At both ends of the UTP cable are RJ-45 panel jacks. One RJ-45 panel jack 42 of each cable line 40 is mounted in a wall of an office with the opposite end RJ-45 panel jack inserted at the appropriate corresponding box 26 location, through the schematic diagram 22.

Each RJ-45 panel jack box 26 is representative of a wall outlet 44 in each room as represented by the schematic diagram 22 at the approximate location in which the wall outlet 44 actually is installed in the room corresponding to the floor plan. Accordingly, if three RJ-45 panel jack boxes 26 are shown in a room, the room which corresponds to the floor plan will also have three wall outlets 44 to which three lines of unshielded twisted pair cable 40 are connected in the actual room and which is cabled to the location of the schematic patch panel 20.

The unshielded twisted pair cable 40 is connected to an RJ-45 panel jack which is inserted from the rear of the schematic patch panel 20 so as to protrude through an RJ-45 panel jack box 26 which corresponds to the actual location of the wall outlet 44 located at the opposite end of the cable 40 to which the RJ-45 panel jack is connected. A telephone-type extension cable 50 is then inserted into the RJ-45 panel jack located at a wall outlet icon RJ-45 panel jack box 26 to form a connection with a network central controller 52 only for the locations at which terminals are connected at the corresponding office location. By this connection, UTP cable lines 40 are activated for only the RJ-45 panel jack boxes 26 which are indicative of cable lines to terminals in the offices, connected to the network central controller 52 by telephone-type extension cable 50.

If an individual were to change offices, for instance, from the location represented by box 10C of the "Library" in FIG. 2, to the Conference Room A and they wanted to locate their computer terminal at location 8A, the telephone type extension cable 50 connected to the network central controller 52 would be moved from box 10C to box 8A to activate the UTP cable 40 connected to the location representative of box 8A. The computer terminal of the individual would then be connected to the actual wall outlet 44 in the Conference Room A on the wall which corresponds to the floor plan at the location labelled 8A so as to reconnect to the activated cable line, now connected to the network central controller 52.

Figure 3:
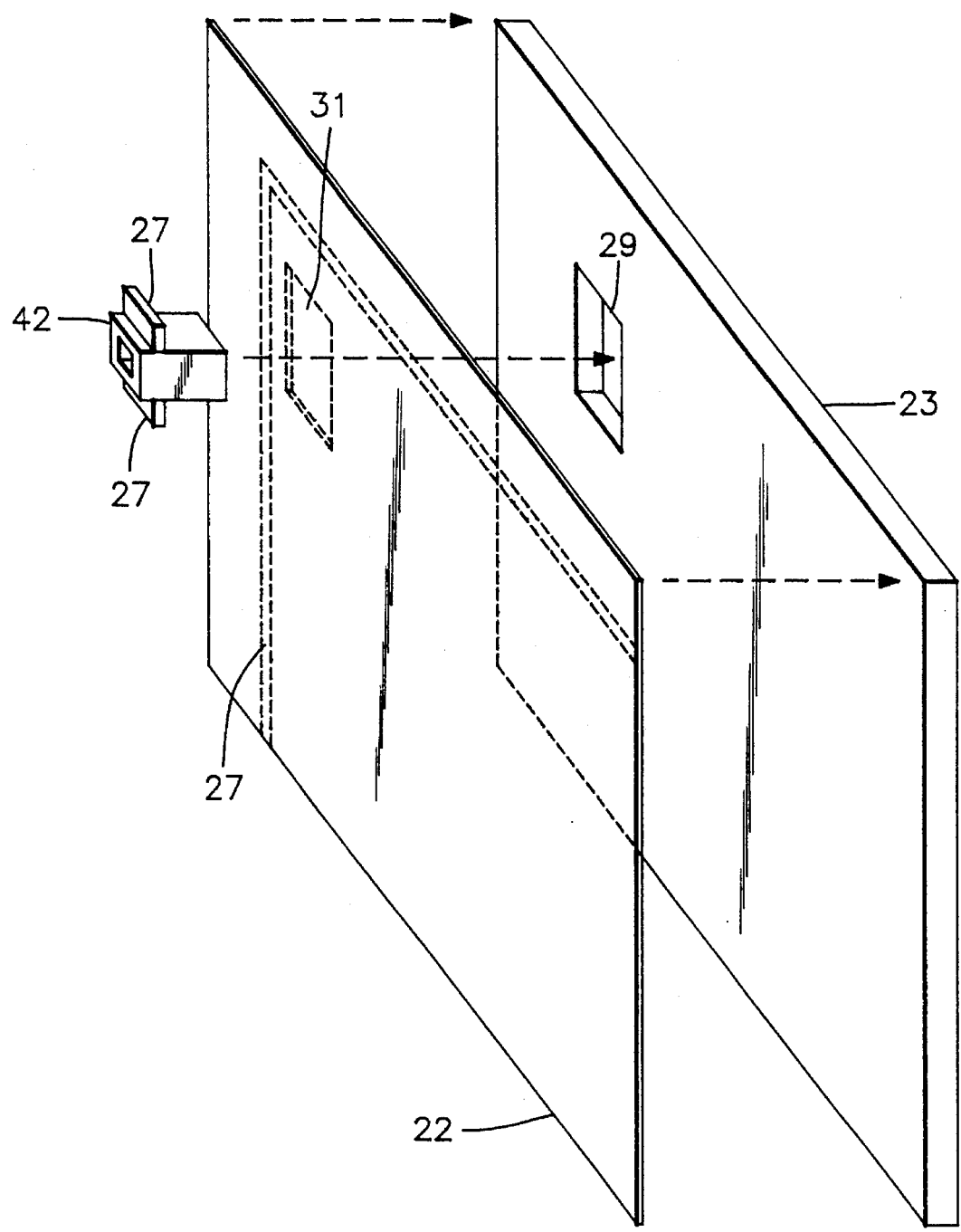
FIG. 3 is an exploded view of an RJ-45 jack being inserted through a photo-enlargement of a floor plan secured to a foam-core board.

As shown in FIG. 3, the floor plan 22 may be dry mounted onto a ¼ inch foam-core board 23. The foam-core board 23 with the overlaying floor plan 22 would then be enclosed within a frame 30 and optionally have a transparent cover mounted on top of the frame 30, which could be locked, for security purposes. The composition of the foam-core board is such that an RJ-45 panel jack 25 having opposing lips 27 can be inserted into an opening 29 cut in the board 22 and an opening 31 cut in the floor plan 22 and be held in place due to the compressibility of the board 22.

Alternately, a metal panel 60, preferably of aluminum and having a thickness of approximate 0.030 inches or stainless steel of a thickness of 0.100 inches can be imprinted or screened with the floor plan 22. An RJ-45 panel jack 42 would be located at holes formed at each RJ-45 panel jack box 26 and be secured in place in the plate by a snap-fit of the panel jack in the opening at RJ-45 panel jack box 26. The plate may be plastic, phenolic or other material capable of sustaining its shape, securely holding the panel jacks and will allow the application of a floor plan, whether screened, dry mounted, etched or painted.

Figure 4:
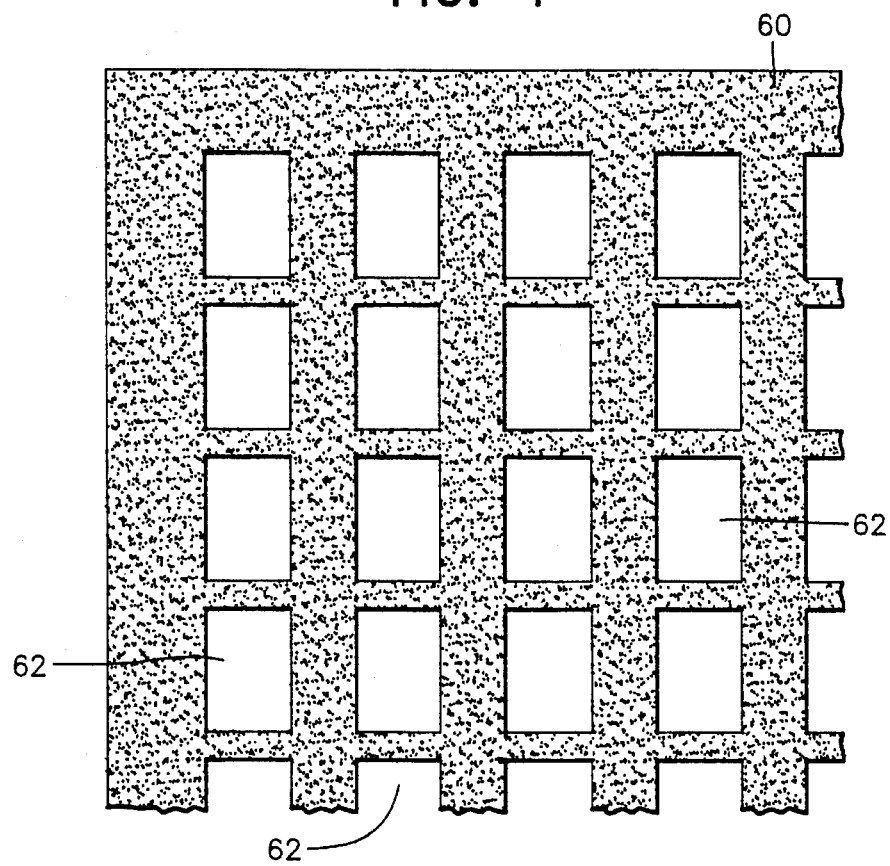
FIG. 4 is a partial view of a stainless steel panel having laser cut openings.

In FIG. 4, stainless steel panel 60 is shown having a plurality of laser cut openings 62. The panel 60 may have 660 such openings 62. The stainless steel panel 60 is then mounted into a frame assembly as shown in FIG. 2.

Figure 8:
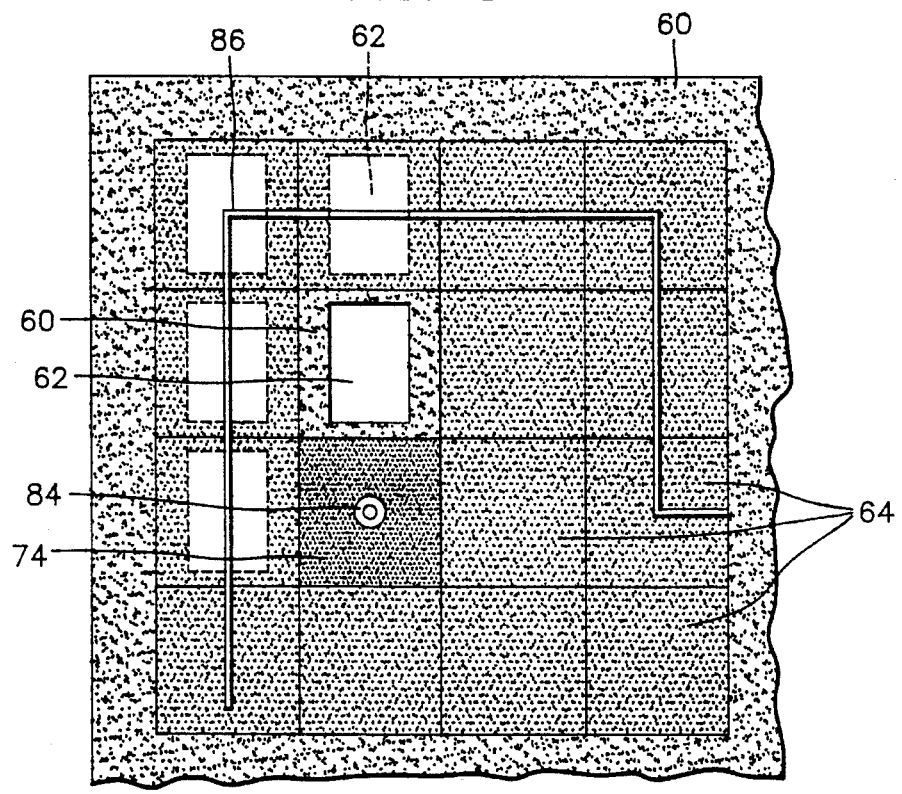
FIG. 8 illustrates a plurality of cover plates secured within openings of the stainless steel panel.
Figures 5A, 5B, 5C, 5D:
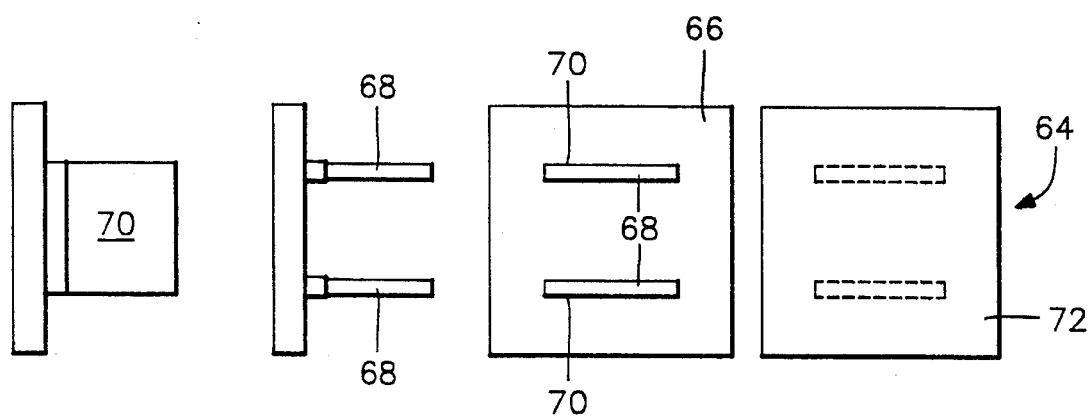
FIG. 5A is a front view of a cover plate for the openings of the stainless steel panel.
FIG. 5B is a back view of the cover plate.
FIG. 5C is a top plan view of the cover plate.
FIG. 5D is a side view of the cover plate.
Figures 6A, 6B, 6C, 6D:
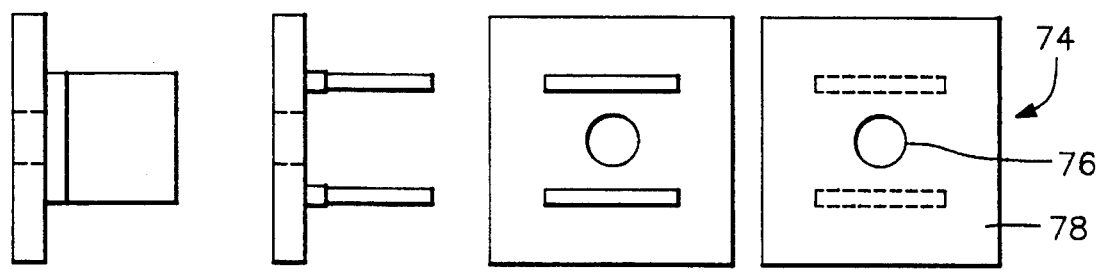
FIG. 6A is a front view of an LED cover plate for the stainless steel panel having an LED mounting hole.
FIG. 6B is a rear view of the LED cover plate.
FIG. 6C is a top plan view of the LED cover plate.
FIG. 6D is a side view of the LED cover plate.

In each of the openings 62 of the panel 60 is placed a cover plate 64 as shown in FIG. 5A. Each cover plate includes on a rear face 66, two lugs 68 having a spacing between exterior faces 70 equal to the width of an opening 62. The cover plate 64 can thereby be removably inserted into the opening 62 such that a facing surface 72 will be exposed. In FIG. 8, a plurality of cover plates 64 are shown inserted into the openings of a panel 60 such that cover plates butt up against adjacent cover plates to form a continuous surface.

Figure 7:
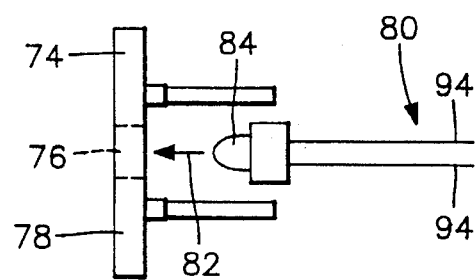
FIG. 7 is an exploded view of an LED being mounted in an LED cover plate.

It is also possible to insert into the opening 62 of the panel 60 an LED cover plate 74 which is similar to cover plate 64 except in LED cover plate 74, an LED mounting hole 76 is centrally located on facing surface 78. As shown in FIG. 7, an LED unit 80 can be inserted into LED cover plate 74 in the direction of arrow 82 so as to locate an LED 84 within LED opening 76 of the LED cover plate 74.

In FIG. 8, an architectural graphic tape 86 is laid on top of the facing surfaces 72 of the cover plates 64 mounted in the openings 62. It is thereby possible to secure an end user floor plan onto the facing surfaces 72 of the cover plates 64. Alternately, an end user floor plan printed on self-adhesive vinyl overlay can be secured to the facing surfaces 72 of the cover plates 64.

Still another method of mounting a floor plan onto the facing surfaces 72 of the cover plates 64 would be to draw, with water-soluble markers, a floor plan of the end user. The water-soluble markers allow a change in the floor plan as would also be achieved by securing a new printed floor plan onto the facing surfaces 72 by either architectural graphic tape or adhesive.

Figure 9:
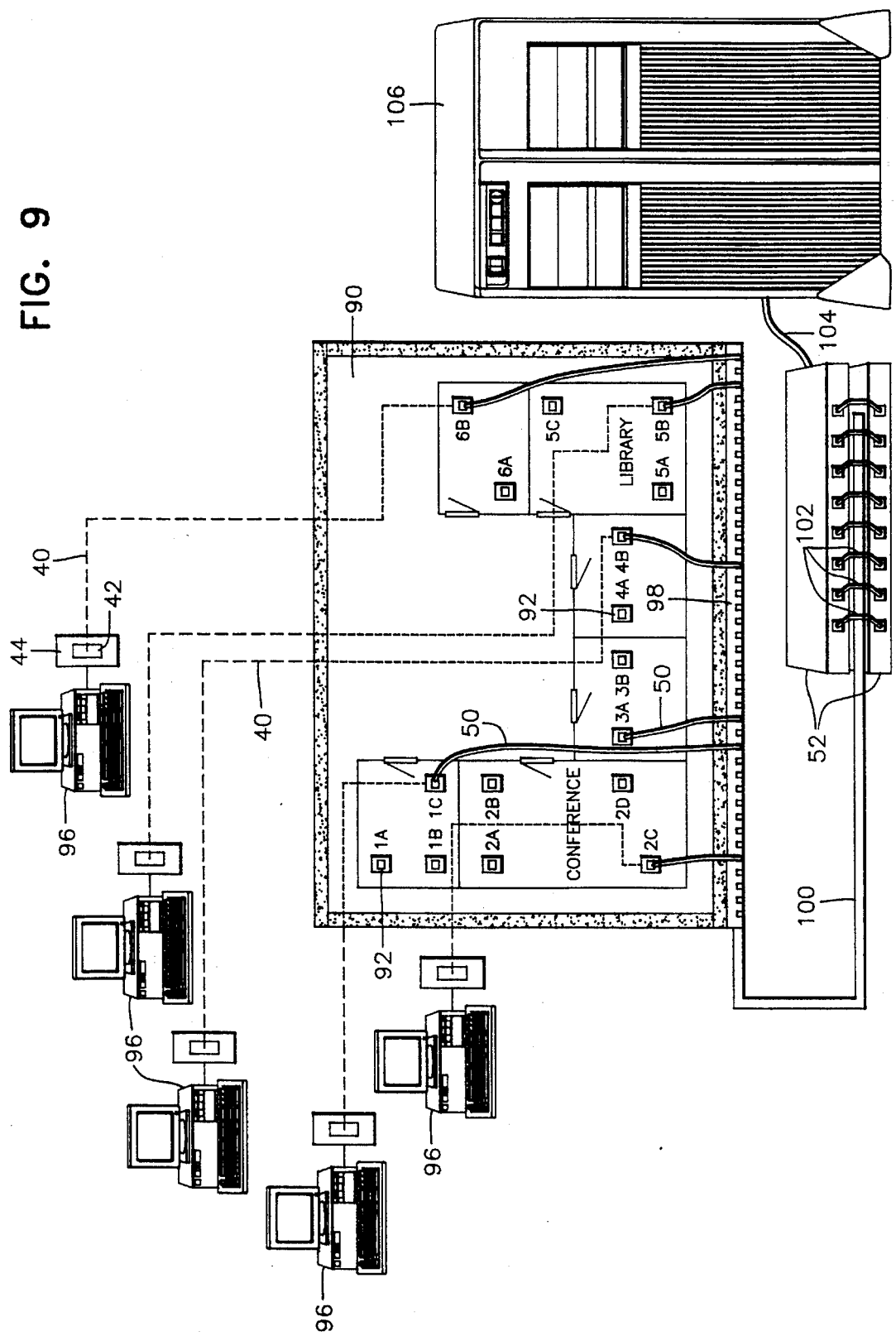
FIG. 9 is a schematic view of a local area network connected via a schematic patch panel to a file server and network central controller.

Once a floor plan 90 is secured on top of the stainless steel panel 60 as shown in FIG. 9, the approximate locations in the floor plan of each RJ-45 panel jack box 92 is cut away from the floor plan 90. The exposed facing surface 72 of a cover plate 64 is pried away from the panel 60. An RJ-45 jack 25 is then secured within the exposed opening 62 of the panel 60. If desired, as shown in FIG. 8, in the space adjacent to an opening 62 within which an RJ-45 jack is to be inserted, a cover plate 64 is removed and replaced with an LED cover plate 74. The two lead wires 94 of the LED assembly 80 are connected to unused connections on the RJ-45 jack. These connections make electrical contact within a specially modified network hub. The LED will light to indicate network activity at the RJ-45 jack, adjacent to which the LED 84 is placed.

As indicated in FIG. 9, and using the same reference numerals as in FIG. 2, the illustrated remote workstations 96 are understood to be connected to a wall outlet 44 having an RJ-45 panel jack 42. The RJ-45 panel jack is then connected by unshielded twisted pair cable 40 to a location on the schematic floor plan 90 corresponding to the actual location of a wall outlet 44 in a room depicted on the floor plan 90. A plurality of patch cables 50 connect workstations 96 to be activated to a cable management channel 98 connected by a patch cable bundle 100 to network controllers/hubs 52 interconnected by patch cables 102. A patch cable 104 then connects the network controllers/hubs 52 to a file server 106.

When an individual is to change offices, the patch cable connections to the floor plan 90 are altered in accordance with movement of the workstation within a single room or to a different room. The workstation is correspondingly reconnected to a new wall outlet 44 as schematically represented on the floor plan 90.

Having described the invention, many modifications thereto will become apparent to those skilled in the art to which it pertains without deviation from the spirit of the invention as defined by the scope of the appended claims.

I claim:

1. A patch panel for a computer local area network, said patch panel comprising:
   a panel including a plurality of openings,
   a plurality of removably secured cover plates inserted into and secured to said plurality of openings and having a facing surface of each cover plate forming a continuous mounting surface, and
   a schematic floor plan representative of a building site located on said continuous mounting surface formed by said facing surfaces of said cover plates located in said plurality of openings to schematically identify locations of wall outlets of said building site and for facilitating easily changing locations of computers in a local area network.

2. A patch panel for a computer local area network as claimed in claim 1, wherein said floor plan is printed and affixed on said continuous surface.

3. A patch panel for a computer local area network as claimed in claim 1, wherein said panel is made of stainless steel.

4. A patch panel for a computer local area network as claimed in claim 1, wherein an electrical jack is inserted in at least some of said openings.

5. A patch panel for a computer local area network as claimed in claim 4, wherein said electrical jack is located in said panel in a location representative of a wall outlet at the building site.

6. A patch panel for a computer local area network as claimed in claim 1, wherein at least some of said cover plates are light emitting diode cover plates.

7. A patch panel for a computer local area network as claimed in claim 5, wherein a light emitting diode is electrically connected to said electrical jack.

8. A patch panel for a computer local area network as claimed in claim 1, wherein said cover plate is removably secured to said panel.

9. A patch panel for a computer local area network as claimed in claim 8, wherein said cover plate includes two projections sized to secure said cover plate within one of said openings.

10. A local area network of computer terminals, said local area network comprising:
    a network central controller,
    a patch panel including a support surface and a schematic floor plan representative of a building site located above said support surface and having marked locations representative of wall outlets, said support surface having a plurality of openings covered with a plurality of removably secured cover plates inserted into and secured to said plurality of openings and having a facing surface of each cover plate foxing a continuous mounting surface and said schematic floor plan being located on said continuous mounting surface,
    a plurality of wall outlets for connection of a computer terminal to said patch panel,
    cable lines interconnecting said plurality of wall outlets to a corresponding marked location on said schematic floor plan of said patch panel representative of a location of each wall outlet,
    a connector at each end of each of said cable lines located at said wall outlets and in one of said openings of said support surface, and
    a cable extension connected between said network central controller and said connector located at said patch panel so that upon connection of a computer terminal with a wall outlet at said connector of one of said cable lines, said computer terminal will be networked with said network central controller and said computer terminal once changed in location in the local areal network is easily changed in connection at the patch panel according to the schematic floor plan.

11. A local area network as claimed in claim 10, wherein said cable lines are unshielded twisted pair cables.

12. A local area network as claimed in claim 10, wherein said connector is a panel jack.

13. A local area network as claimed in claim 10, wherein said patch panel includes means for retaining said connector at said marked locations.

14. A local area network as claimed in claim 10, wherein said floor plan is located on a metal panel.

* * * * *